(12) United States Patent
Magadi Rangaiah et al.

(10) Patent No.: US 8,600,388 B2
(45) Date of Patent: Dec. 3, 2013

(54) METHOD AND APPARATUS FOR CELL RESELECTION FOR A WIRELESS COMMUNICATION DEVICE

(75) Inventors: Raghavendra Magadi Rangaiah, West Bromwich (GB); Andrew John Farnsworth, Bromsgrove (GB); Takashi Suzuki, Ichikawa (JP)

(73) Assignee: BlackBerry Limited, Waterloo (CA)

( * ) Notice: Subject to any disclaimer, the term of this patent is extended or adjusted under 35 U.S.C. 154(b) by 90 days.

(21) Appl. No.: 13/286,723

(22) Filed: Nov. 1, 2011

(65) Prior Publication Data

US 2013/0109394 A1    May 2, 2013

(51) Int. Cl.
*H04W 36/00* (2009.01)

(52) U.S. Cl.
USPC ............ 455/436; 455/437; 455/438; 370/329; 370/328; 370/331

(58) Field of Classification Search
USPC ............ 455/432.1, 432.3, 433, 434, 435, 436, 455/437, 438, 439, 442, 450, 451, 452.1, 455/452.2, 524, 422.1; 370/310, 329, 331, 370/332, 333, 328, 338
See application file for complete search history.

(56) References Cited

U.S. PATENT DOCUMENTS

| | | | | |
|---|---|---|---|---|
| 7,483,702 B2 * | 1/2009 | Yeo et al. | | 455/449 |
| 8,121,093 B2 * | 2/2012 | Chen | | 370/331 |
| 2004/0202140 A1 * | 10/2004 | Kim et al. | | 370/335 |
| 2006/0084443 A1 * | 4/2006 | Yeo et al. | | 455/449 |
| 2006/0258386 A1 * | 11/2006 | Jeong et al. | | 455/525 |
| 2007/0054666 A1 * | 3/2007 | Choi | | 455/434 |
| 2008/0102896 A1 * | 5/2008 | Wang et al. | | 455/560 |
| 2009/0036127 A1 * | 2/2009 | Kim | | 455/435.2 |
| 2009/0088160 A1 * | 4/2009 | Pani et al. | | 455/436 |
| 2009/0117905 A1 * | 5/2009 | Watanabe et al. | | 455/437 |
| 2009/0239533 A1 * | 9/2009 | Somasundaram et al. | | 455/434 |
| 2010/0075625 A1 * | 3/2010 | Wu | | 455/404.1 |
| 2010/0216474 A1 * | 8/2010 | Park et al. | | 455/436 |
| 2010/0278146 A1 * | 11/2010 | Aoyama et al. | | 370/331 |
| 2011/0117929 A1 * | 5/2011 | Yamagishi et al. | | 455/456.1 |
| 2011/0165909 A1 * | 7/2011 | Huang et al. | | 455/525 |
| 2012/0040669 A1 * | 2/2012 | Boley et al. | | 455/435.1 |
| 2012/0044910 A1 * | 2/2012 | Maeda et al. | | 370/332 |
| 2012/0082051 A1 * | 4/2012 | Kim et al. | | 370/252 |
| 2012/0113957 A1 * | 5/2012 | Chen | | 370/331 |
| 2012/0236751 A1 * | 9/2012 | Lee et al. | | 370/252 |
| 2012/0264435 A1 * | 10/2012 | Rangaiah et al. | | 455/437 |
| 2012/0315890 A1 * | 12/2012 | Suzuki et al. | | 455/422.1 |
| 2012/0322447 A1 * | 12/2012 | Ramachandran et al. | | 455/436 |
| 2013/0053035 A1 * | 2/2013 | Johansson et al. | | 455/436 |

(Continued)

FOREIGN PATENT DOCUMENTS

WO    2011121172 A1    10/2011

OTHER PUBLICATIONS

3GPP TSG-RAN WG2 Meeting #53; "Indication for Reading of Extension Segments for SIB 11," Shanghai, China, May 8-12, 2006; 15 pages.

(Continued)

*Primary Examiner* — Jean Gelin
(74) *Attorney, Agent, or Firm* — Fitch, Even, Tabin & Flannery LLP

(57) ABSTRACT

A method and apparatus for cell reselection for a wireless communication device are disclosed.

18 Claims, 8 Drawing Sheets

(56) References Cited

U.S. PATENT DOCUMENTS

| | | | |
|---|---|---|---|
| 2013/0053039 A1* | 2/2013 | Jorguseski et al. | 455/436 |
| 2013/0053091 A1* | 2/2013 | Jorguseski et al. | 455/524 |
| 2013/0065593 A1* | 3/2013 | Roberts et al. | 455/436 |
| 2013/0065594 A1* | 3/2013 | Somasundaram et al. | 455/436 |
| 2013/0089029 A1* | 4/2013 | Jang et al. | 370/328 |

OTHER PUBLICATIONS

3GPP TS 25.331; Technical Specification Group Radio Access Network; Radio Resource Control (RRC); Protocol specification (Release 10); Jul. 1, 2011; 1879 pages (uploaded in 9 parts).

Extended European Search Report from related European Patent Application No. 11187368.3; dated Feb. 15, 2012; 9 pages.

* cited by examiner

METHOD AND APPARATUS FOR CELL RESELECTION FOR A WIRELESS COMMUNICATION DEVICE

BACKGROUND

1. Technical Field

This application relates to mobile telecommunications systems in general, and in particular relates to a method and apparatus for handling UE mobility information for a wireless communication device. In particular, though not limited to, the application relates to a method and apparatus for cell reselection.

2. Description of the Related Art

In a typical cellular radio system, mobile user equipment (UE) communicates via a radio access network (RAN) to a core network. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

A radio access network covers a geographical area typically divided into a plurality of cell areas. Each cell area is served by at least one base station, which in UMTS may be referred to as a Node B. Each cell is typically identified by a unique identifier which is broadcast in the cell. The base stations communicate at radio frequencies over an air interface with the UEs within range of the base station. Several base stations may be connected to a radio network controller (RNC) which controls various activities of the base Stations. The radio Network controllers are typically connected to a core network.

UMTS is a third generation public land mobile telecommunication system. Various standardization bodies are known to publish and set standards for third generation public land mobile telecommunication systems, each in their respective areas of competence. For instance, the 3GPP (Third Generation Partnership Project) in addition to publishing and setting standards for UMTS, also publishes and sets standards GSM (Global System for Mobile Communications) 3GPP2 (Third Generation Partnership Project 2) publishes and sets standards for CDMA (Code Division Multiple Access).

The 3GPP Technical Specification 25.331, release 10 addresses some aspects of UMTS RRC (Radio Resource Control) protocol requirements between the UMTS Terrestrial Radio Access Network (UTRAN) and the mobile user equipment (UE). 3GPP Technical Specification 25.304, release 10, addresses some UE procedures in Idle mode and procedures for cell reselection in connected mode. 3GPP Technical Specification 25.133, release 10, addresses some requirements for support of radio resource management (FDD). The specifications are referred to herein as the "Standard", and are incorporated herein by reference.

More particularly clause 8.1.1.6.11a of the 25.331 specification relates to some aspects of handling information in System Information Block (SIB) type 11 bis. Clause 5.2.6 of the 25.304 specification relates to some aspects of cell reselection evaluation process. Clause 4.2.2.1 of the 25.133 specification relates to some aspects of measurement and evaluation of cell selection criteria of a serving cell.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION OF THE DRAWINGS

Figure 1:
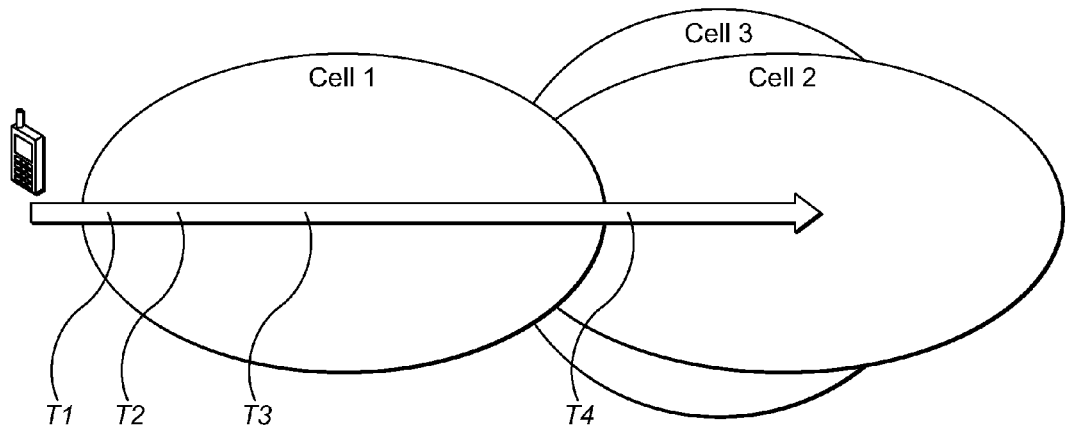
FIG. 1 is a diagram capturing the current 3GPP standardised UE behaviour as described therein.

A method and apparatus for cell reselection for a wireless communication device is described herein. In the following description, for the purposes of explanation, numerous specific details are set forth in order to provide a thorough understanding of the new, inventive, and non-obvious concepts disclosed herein (hereinafter "concepts" or "concept"). It will be apparent, however, to one skilled in the art that the technique may be practised without these specific details. In other instances, well-known structures and devices are shown in block diagram form in order to avoid unnecessarily obscuring the concepts disclosed herein.

The needs identified in the foregoing Background, and other needs and objects that will become apparent from the following description, are achieved by, in one aspect, a method and apparatus for cell reselection for a wireless communication device. In other aspects, the concept encompasses a wireless telecommunication device and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files etc. In particular, the method may be implemented in a mobile telecommunications device, with or without voice capabilities, or other electronic devices such as handheld or portable devices.

OVERVIEW

An overview of is now given of existing problems and how they are addressed according to the approaches described below. In the Figures, like reference numerals denote like components/messages and are not described unless repetition is required.

User equipment (UE) mobility within a network, such as a Universal Terrestrial Radio Access Network (UTRAN), may be either UE controlled or network controlled. In the case of a UTRAN network, UE controlled mobility is used in Idle mode and the states CELL_PCH, URA_PCH, CELL_FACH of Radio Resource Control (RRC) Connected mode and network controlled mobility is used in the CELL_DCH state of RRC Connected mode.

In the case of UE controlled mobility, the UE chooses a serving cell on which to 'camp' by the processes of cell selection and cell reselection. Cell selection is the process of choosing a serving cell when the UE does not currently have a serving cell (for example, when the UE has been first switched on, or when the UE is returning from loss of network coverage). Cell reselection is the process of changing from one serving cell to another serving cell. Typically the cell reselection process involves first performing measurements of the signal strength and/or signal quality of the serving cell and a number of candidate neighbour cells and then reselecting to one of the neighbour cells that is determined to offer better signal strength and/or quality than the current serving cell.

The network guides or assists the UE controlled cell reselection by providing control information in broadcast system information messages. The information may include neighbour cell lists to identify the carrier frequency and identity of candidate neighbour cells for cell reselection, and may also include various offsets, thresholds and other parameters to allow the network to control the UE's cell reselection behaviour. In a UTRAN cell, the broadcast Master Information Block (MIB) and System Information Block (SIB) Type 3, 4, 11, 11 bis, 12, 18, and 19 messages may contain information related to cell reselection.

UTRAN system information is structured into a number of SIBs with each SIB carrying a set of related system information. The SIBs are repeatedly transmitted on the Broadcast Control Channel (BCCH) of every UTRAN cell. For transmission, large SIBs are segmented into up to 16 segments of size 222 bits, giving a maximum possible SIB size of 3552 bits.

SIB 11, 11 bis and 12 contain information related to cell reselection. More specifically their content typically includes:

A list of up to 32 intra-frequency cells (i.e. cells on the same UTRAN carrier frequency as the cell broadcasting the information) that are identified by their primary scrambling code (PSC). In addition for each listed cell, there may be additional parameters (e.g. thresholds and offsets) that enable the network to control the UE's cell reselection behaviour.

A list of up to 32 inter-frequency cells (i.e. cells on a different UTRAN carrier frequency from the cell broadcasting the information) that are identified by a UTRAN Absolute Radio Frequency Channel Number (UARFCN) and PSC. Again, additional parameters may be included for each cell.

A list of up to 32 inter-RAT cells (i.e. cells using a different Radio Access Technology (RAT) such as GERAN). Again, additional parameters may be included for each cell.

SIB11 and SIB11bis are used by UEs that are in Idle mode and SIB12 is used, in addition to SIB11 and SIB11bis, by UEs that are in RRC Connected mode. It has been suggested that the maximum SIB size of 3552 bits could be the limiting factor in determining how many cells could be included in the neighbour cell lists in SIB11 (i.e. it may not be possible to fit 32 intra-frequency, 32 inter-frequency and 32 inter-RAT cells, together with associated parameters, in SIB11 due to the 3552 bit limit). To address this problem, SIB11bis provides extra capacity to send the neighbour cell lists (although the maximum cells of each type that may be included across SIB11 and SIB11bis may remain the same at 32). SIB11bis is a "secondary" SIB to SIB11, the "primary" SIB11, in that SIB11 is to be received (received successfully and processed) first before there can be measurements and reselection evaluation of cells listed within SIB11bis. There could be more than one such secondary SIB to a primary SIB. Also, SIB11 would typically be populated in preference to SIB11bis. SIB11 and 11bis are of the same type, in that they can generally contain the same type of information. Two SIBs are of the same type if a set of items is constructed by taking items from both SIBs. The set of items can be constructed as a list, a table, a queue etc. In one example, the set of items can be a list of neighbour cells, presented in SIB11 and SIB11bis in two parts, for instance. The information is such that, in one example, good systems information is ensured when using information from only the primary SIB, or when information from both SIBs when combined. SIB11bis can be thought of, essentially, as an overflow to SIB11.

The neighbour cell lists contained in SIB11, SIB11bis and SIB12 are used to build a UE internal variable CELL_INFO_LIST and the order of the cells in this variable is derived from applying SIB11, then SIB11bis, then SIB12. The cells in this variable are used for measurements and measurement reporting if the UE later moves into CELL_DCH, for example. A problem identified is that if the UE were to place the cells in the variable in the wrong order (for example, deriving the order from SIB11bis, then SIB11 and then SIB12) and the UE moves into CELL_DCH state then subsequent updates to the list (addition, removal, or updating of cell information performed by reference to the cell's position in the list) as the UE moves and also inter-RAT measurements reports (which report cells by reference to their position in the list) would not be interpreted correctly. The order of the cells in the variable may not have any impact on cell reselection operation.

The Standard 3GPP TS 25.331v10.4.0 "Radio Resource Control (RRC); Protocol specification (Release 10), 2011-06, specifies the following:

8.1.1.6.11a System Information Block Type 11bis
The UE should store all relevant IEs included in this system information block. The UE shall:
1> after reception of SIB11 act upon the received IEs "Intra-frequency cell info list", "Inter-frequency cell info list" and "Inter-RAT cell info list" as described in subclause 8.6.7.3;

From the above requirement, the UE is required to have received (received and processed) SIB11 before it processes SIB11bis. This means that if SIB11bis is received before SIB11 the UE waits for SIB11 to be received and then it processes SIB and then SIB11bis. This ensures that the CELL_INFO_LIST is constructed in the correct order but has the consequence that measurements of cells listed in SIB11bis are not started until SIB11 has been received as well. Conversely, there is no such requirement for SIB11bis to be received before SIB11 is processed. This means that if SIB11 is received before SIB11bis the UE does not need to wait for SIB11bis before it processes SIB11 and starts measurements of the cells listed in SIB11.

A problem with delaying the measurement and reselection to cells listed in SIB11bis until after SIB11 has been received, is that the UE may lose coverage (or go out of service) of the serving cell and have to start a cell selection procedure, when one of the cells listed in SIB11bis may have been a suitable candidate for cell reselection. Thus the UE will experience an unnecessary interruption in service. During such a service interruption, the UE can not receive paging for mobile terminated calls or data activity, and can not initiate mobile originated calls or data activity.

Typically, both SIB11 and SIB11bis may be scheduled with the same repetition period. SIB11 is likely to be close to the maximum SIB size and therefore segmented into 16 or nearly 16 segments, all of which are transmitted within the repetition period. SIB11bis is likely to be smaller and hence have fewer segments to be transmitted within the same repetition period. If the coverage is poor then it may take many seconds (even up to, for example, 20 s) to receive SIB11. This is due to the large number of segments of the SIB and the necessity for all of the segments to be received correctly before the complete SIB can be reconstructed.

Consequently, in such conditions it is a quite common occurrence in the field that the UE does lose coverage of the serving cell before it has successfully received SIB11. Given that SIB11bis is an overflow SIB used by operators when SIB11 size nears the maximum possible SIB size, SIB11bis may be relatively small and therefore have relatively few segments compared to SIB11. Therefore it is quite likely that SIB11bis may be successfully received before SIB11.

To illustrate the behaviour according to the Standard, FIG. 1 shows a scenario where SIB11 and SIB11bis are successfully acquired from a Cell 1 and the UE successfully reselects to Cell 2. The sequence of events is as follows:

T1 UE is in Idle mode (or CELL_PCH, URA_PCH or CELL_FACH) and reselects into Cell 1 which is broadcasting both SIB and SIB11bis. The UE starts the acquisition of both SIBs.

T2 UE successfully acquires SIB11bis that contains the information on Cell 3 which may be on a different carrier frequency from Cell 1 and Cell 2.

T3 UE successfully acquires SIB11 that contains the information on Cell 2. The UE starts performing measurements and cell reselection evaluation according to the combined list of cells from SIB11 and SIB11bis.

T4 UE successfully reselects to Cell 2.

Figure 2:
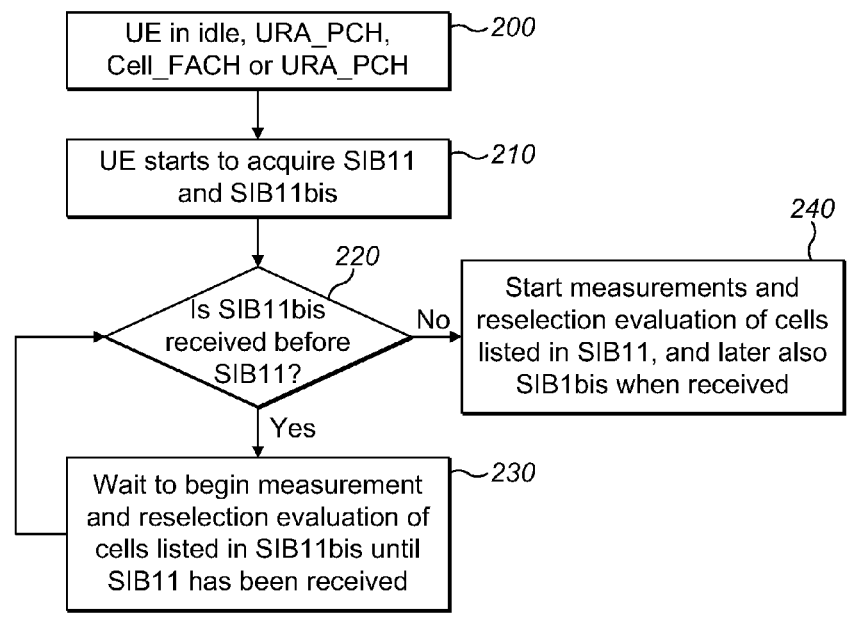
FIG. 2 is a flow diagram capturing the current 3GPP standardised UE behaviour as described therein.

This standard behaviour is also illustrated in the flow diagram of FIG. 2. In step 200, the UE is in one of Idle mode, or one of the connected states URA_PCH, Cell_PCH, or Cell_FACH. The UE selects or reselects a cell that is broadcasting SIB11 and SIB11bis and in 210, the UE starts to acquire SIB11 and SIB11bis. In 220, it is determined whether SIB11bis has been acquired before SIB11. If so, then in 230 the UE waits for SIB11 to be received, with the method returning to step 220.

If SIB11bis has not been acquired first, then in 240, when SIB has been acquired, the UE starts measurements and reselection evaluation towards, or "of", cells in SIB11, and also SIB11bis once acquired.

Figure 3:
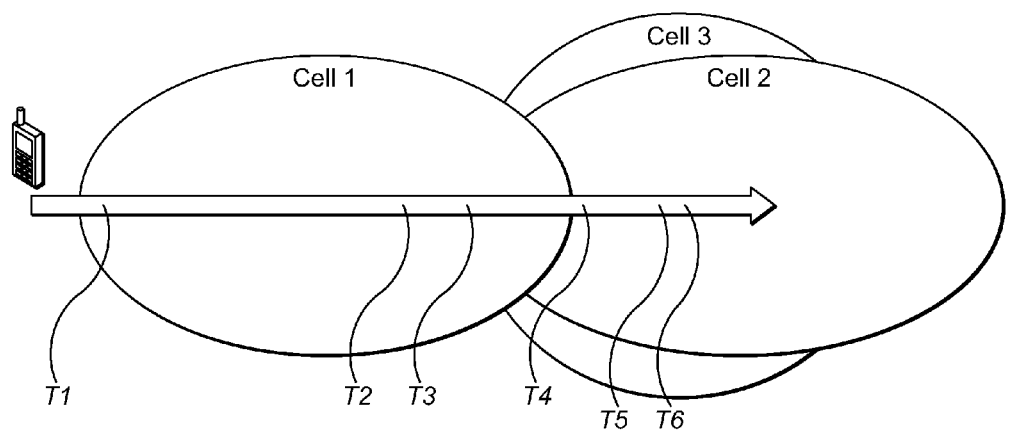
FIG. 3 is a diagram capturing the current 3GPP standardised UE behaviour as described therein.

However, FIG. 3 shows an example according to the behaviour in line with the Standard where SIB11bis is acquired from a cell but SIB11 is not successfully acquired. As a consequence the UE goes out of service before it can perform a cell reselection. The sequence of events is as follows:

T1 UE is in CELL_DCH state.

T2 UE is moved from CELL_DCH state, say, to Idle mode, CELL_PCH, URA_PCH or CELL_FACH. At the release of CELL_DCH state the UE selects Cell 1 which is broadcasting both SIB and SIB11bis. The UE starts the acquisition of both SIBs.

T3 UE successfully acquires SIB11bis that contains the information on Cell 3 which may be on a different carrier frequency from Cell 1 and Cell 2.

T4 Before the UE successfully acquires SIB11, the signal level of Cell 1 drops so that the cell no longer meets the cell selection criteria (i.e. S<=0). When this condition occurs, the Standard 3GPP TS 25.133v10.2.0 "Requirements for support of radio resource management (FDD) (Release 10)", 2011 requires the UE to continue searching for cells listed in system information for a period of 12 s (if the UE is in Idle mode, CELL_PCH state or URA_PCH state, or for a period of 4 s if the UE is in CELL_FACH state). As the UE has not yet acquired SIB11, and has acquired but not yet acted on the content of SIB11bis, the UE does have any cell list to use during this, for example, 12 s or 4 s period. As a consequence, no alternative cell can be found during this 12 s or 4 s period; the only way in which the UE could return to service during this period is if the quality of the serving cell improves.

T5 At the end of the 4 s or 12 s period, having not found any cell to which to reselect, the UE goes Out of Service (OoS). The UE starts a cell selection process.

T6 During the cell selection process the UE finds and selects either cell 2 or cell 3. It is likely that the UE will find and select cell 2 before cell 3 as the UE might typically search for other cells on the current carrier frequency before expanding the search to other carrier frequencies.

In the scenario in FIG. 1, the UE had sufficient time to acquire SIB11 and SIB11bis before it became necessary to perform a cell reselection from Cell 1 to Cell 2. In contrast, in the scenario in FIG. 3 there was insufficient time to acquire SIB11 and SIB11bis before cell reselection was necessary. In this particular example there was insufficient time because the UE was moved from DCH state to Idle (or PCH/FACH states) close to the edge of Cell 1 but there may be many other scenarios where there is little time to acquire the SIBs before reselection is necessary.

EXAMPLE 1

As discussed above, the Standard 25.331v9.4.0: section 8.1.1.6.11a describes behaviour of the UE in relation to SIB11bis:

The UE should store all relevant IEs included in this system information block. The UE shall:

1> after reception of SIB11 act upon the received IEs "Intra-frequency cell info list", "Inter-frequency cell info list" and "Inter-RAT cell info list" as described in subclause 8.6.7.3;

According to example 1:

The UE should store all relevant IEs included in this system information block. The UE shall:

2> if the UE has not received SIB11, the UE shall start measurements and cell reselection evaluation of cells listed in SIB11bis;

after reception of SIB11 act upon the received IEs "Intra-frequency cell info list", "Inter-frequency cell info list" and "Inter-RAT cell info list" as described in subclause 8.6.7.3;

In this example, it is in receipt of SIB11 the UE starts measurements and cell reselection evaluation of cells listed in SIB11bis. In other words, this example applies to a UE that does not have a SIB11 from the serving cell that is indicated as being valid when it receives SIB11bis. By allowing measurements and cell reselection evaluation of the cells listed in SIB11bis, instead of waiting for the reception of SIB11, this example offers the advantage of reducing unnecessary service interruptions.

Figure 4:
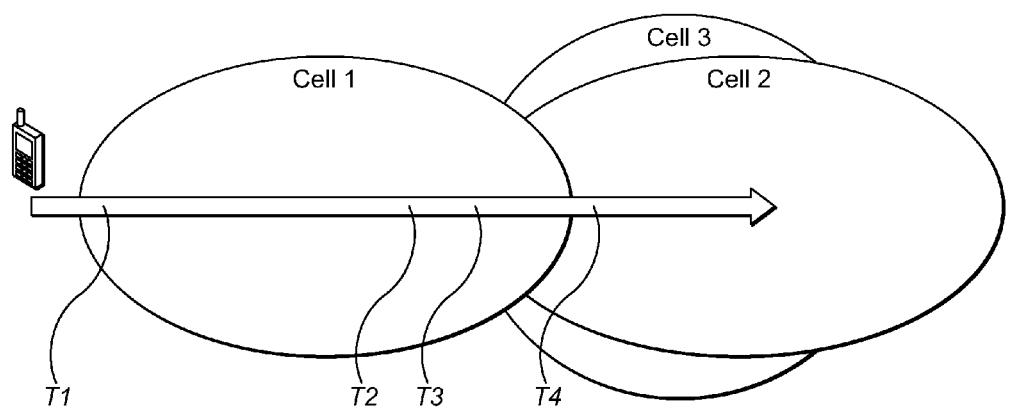
FIG. 4 is a diagram capturing the current 3GPP standardised UE behaviour as described therein.

FIG. 4 shows the same scenario as FIG. 1 or 3, but with the UE implementing example 1. Steps T1 and T2 are identical to those in FIG. 3. The sequence of events is as follows:

T1 UE is in CELL_DCH state.

T2 UE is moved from CELL_DCH state to Idle mode, CELL_PCH, URA_PCH or CELL_FACH. At the release of CELL_DCH state the UE selects Cell 1 which is broadcasting both SIB11 and SIB11bis. The UE starts acquisition of both SIBs.

T3 UE successfully acquires SIB11bis that contains the information on Cell 3 which may be on a different carrier frequency from Cell 1 and Cell 2. The UE starts performing measurements and cell reselection evaluation according to the list of cells from SIB11bis.

T4 UE successfully reselects to Cell 3.

The UE may reselect to a cell that may not necessarily be the most appropriate neighbour cell for reselection. For example, if the UE was using the complete neighbour cell list compiled from both SIB11 and SIB11bis then the UE might reselect to a cell A, whereas if the UE received SIB11bis first then it may end up reselecting a less optimal cell B from SIB11bis even before SIB11 is received. The cells listed in SIB11bis may be less appropriate cells for reselection as one deployment approach would be for the network operator to populate SIB11 with the most likely reselection candidates. Although the UE may reselect to a less appropriate cell for reselection, this is probably preferable to a service interruption.

Figure 5:
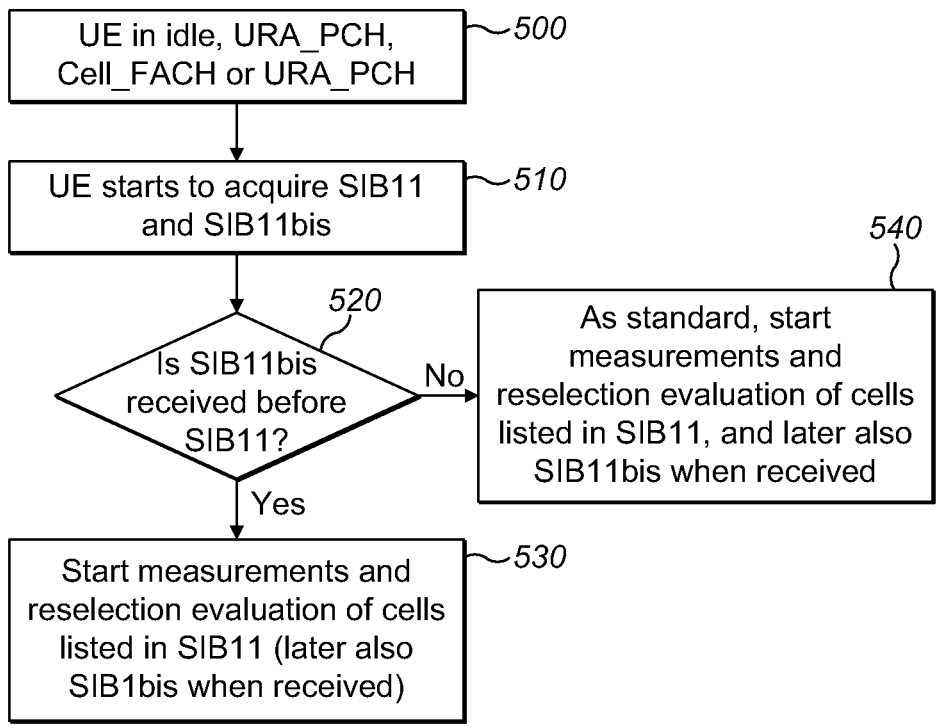
FIG. 5 is a flow diagram illustrating steps performed according to a first aspect of the approach described herein.

The flow diagram of FIG. 5 also illustrates example 1. In step 500, the UE moves into one of Idle mode, or one of the connected states URA_PCH, Cell_PCH, or Cell_FACH. The UE selects a cell in 510 that is broadcasting SIB11 and SIB11bis and starts (initiates) to acquire SIB11 and SIB11bis. In 520, it is determined whether SIB11bis has been acquired before SIB11.

If this is the case, then in 530 the UE starts measurements and reselection evaluation of (towards) cells listed in SIB11bis without waiting for receipt of SIB11. That is, measurement and reselection evaluation of SIB11bis information are begun independent of receipt, or later receipt, of SIB11.

If SIB11bis has not been received first, then, according to the Standard, in 540, when SIB11 has been received, the UE starts measurements and reselection evaluation towards cells in SIB11, and also cells in SIB11bis once it is acquired.

EXAMPLE 1a

Example 1a is an alternative that can be used in conjunction with example 1. This alternative aims to improve the trade-off between avoiding unnecessary service interruptions and the risk of reselection to a less than optimal cell. Example 1a may in other alternatives, be applied together with examples 1b and/or 1c discussed below.

According to example 1a, when the UE has received SIB11bis before it has received SIB11, the UE starts measurements on the cells listed in SIB11bis but does not allow cell reselection to any of those cells if the quality (Ec/No for example) of the current serving cell is good. When SIB11 is received and the complete neighbour cell list is available then the UE allows reselection to any cell in the complete list compiled from SIB11 and SIB11bis. However, if the quality of the current serving cell is poor, then the UE does allow cell reselection to those cells in SIB11bis before SIB11 has been received in order to minimise the unnecessary service interruptions.

In the 25.331 standard, example wording to reflect this change is as follows:

The UE should store all relevant IEs included in this system information block. The UE shall:

1> before reception of SIB11 the UE shall act according to the requirements in [25.304];

after reception of SIB11 act upon the received IEs "Intra-frequency cell info list", "Inter-frequency cell info list" and "Inter-RAT cell info list" as described in subclause 8.6.7.3;

The 25.304 Standard could include the wording:

5.2.6.1.2b Measurements for cell lists in System Information Block type 11bis

If the UE has received SIB11bis but not received SIB11, the UE shall:

perform measurements on all cells listed in SIB11bis according to the measurement rules above;

if $Srxlev_{ServingCell} <= S_{SIB11\text{-}threshP}$ or $SqUal_{ServingCell} <= S_{SIB11\text{-}threshQ}$:

allow reselection to any of the cells listed in SIB11bis, in accordance with the requirements elsewhere in this specification;

else:

not allow reselection to any of the cells listed in SIB11bis;

where $S_{SIB11\text{-}threshP}$ and $S_{SIB11\text{-}threshQ}$ are values that could be fixed, or signalled by another SIB, for instance.

Figure 6:
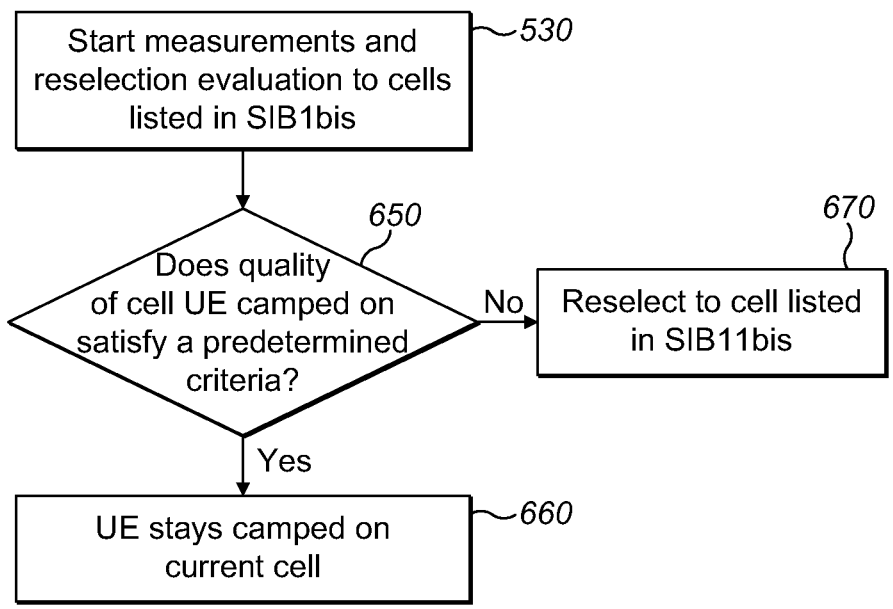
FIG. 6 is a flow diagram illustrating steps performed according to an alternative related to the first aspect of the approach described herein.

Example 1a is illustrated in FIG. 6. The method steps preceding and including 530 shown in FIG. 6, can be, and are in this illustration, the same as those including and preceding 530 in FIG. 5.

After 530, according to this variant to example 1, in 650 there is an assessment of whether the quality of the cell the UE is currently camped on satisfies predetermined criteria. If it does, then in 660 the UE stays camped on the current cell.

If the quality of the cell the UE is currently camped on does not satisfy predetermined criteria, then in 670, the UE reselects to a cell listed in SIB11bis assuming SIB11bis is a better cell.

There are several possible options for judging of the serving cell quality is poor. These include, but are not limited to, for example:

The serving cell received signal strength (also referred to as the Received Signal Code Power or RSCP) is below a threshold, or the serving cell signal to interference ratio (also referred to as Ec/Io) is below a threshold. It would be possible to reuse an existing threshold such as Qrxlevmin or Qqualmin which are used today in criteria for a cell to be suitable, or it would be possible to define new thresholds specifically for this purpose, or it would be possible to define a margin or offset above or below an existing threshold.

SIB11 is not successfully received after attempting to receive it for a certain time. This could be a fixed predetermined time such as 10 s, or could be a time derived from the repetition period of SIB11 (e.g. 3×repetition period), or could be a time signalled from the network to the UE in another SIB, for example.

Absolute number of CRC errors, or the rate of CRC errors on the PCCPCH (the physical channel that carries the system information), exceeds a threshold.

In relation to the final option, in one example, to determine the quality of Pccpch reception the reception of data on Pccpch can be monitored. Every 20 ms zero or one transport blocks are received in this example. When a transport block is received, it will contain a CRC checksum. This enables the validity of the transport block to be checked by performing a checksum verification process. If the transmitted bits are correctly received, then the checksum verification process will identify the transport block as passing the CRC check. If some of the bits have been corrupted so that the received bits are different from the transmitted bits, then it is very likely that the transport block will fail the CRC check. Passing and failing transport blocks can be referred to as having good and bad CRCs respectively.

When decoding Pccpch, because scheduling information is available, transport blocks may not be decoded every 20 ms. So every 20 ms there are three possible states for a transport block reception—no transport block (TB), TB with good CRC, or TB with bad CRC.

One approach to implementing this example includes tracking the CRC error rate (CRC errors/sec) every second. After setting up Pccpch, the CRC Timer can be started when the first bad CRC on Pccpch is received. For any CRC error rate, the approach then decrements the CRC count every sec by MIN(a minimum threshold value–a "good" CRC count). When CRC count eventually reaches a maximum threshold number then the cell is barred.

The quality of Pccpch can be judged based on a combination of the rate of TBs of good CRCs and the rate of TBs with bad CRCs.

It is noted that in this example, 650 follows after 530. That is, neighbour cell measurements are begun on receipt of SIB11bis, even before a determination in relation to the predetermined criteria in 650. This has advantages such as allowing faster reselection because of the time between starting measurements and getting the first measurement. However, in alternatives, 650 and 530 may be reversed so that there is effectively a different time for starting measurements. Similar alternatives exist in relation to other examples in relation to FIGS. 7-10, for instance.

The advantages of this approach include reducing the unnecessary service interruptions by not requiring a UE to reselect if current serving cell quality is acceptable. This also has the advantage of saving resources.

EXAMPLE 1b

Example 1b is another alternative that can be used in conjunction with example 1 to minimise the risk of reselection to a less than optimal cell from SIB11bis when a cell listed in SIB11 (that is not yet successfully acquired) may be available. This alternative 1b may be applied together with 1a and/or 1c.

According to the Standard 25.331v9.4.0, 8.1.1.6.11a

The UE should store all relevant IEs included in this system information block. The UE shall:

1> after reception of SIB11 act upon the received IEs "Intra-frequency cell info list", "Inter-frequency cell info list" and "Inter-RAT cell info list" as described in subclause 8.6.7.3;

According to this example 1b, the UE is only permitted to reselect to a cell from SIB11bis, prior to successful acquisition of SIB11, if that cell meets an additional criteria for the quality of the candidate neighbour cell from SIB11bis. That is, reselection is conditional upon an extra condition related to the candidate cell (in addition to the candidate cell satisfying usual cell reselection criteria.)

Figure 7:
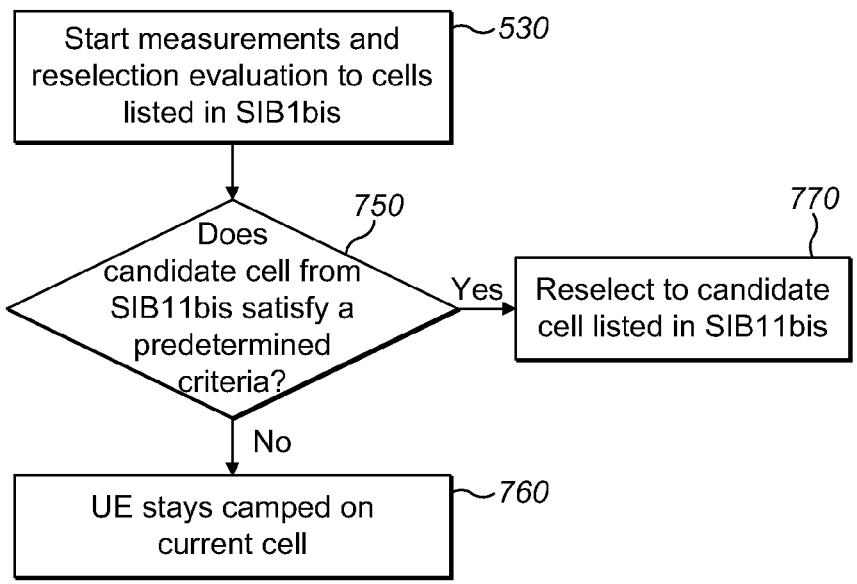
FIG. 7 is a flow diagram illustrating steps performed according to an alternative related to the first aspect of the approach described herein.

Example 1b is illustrated in FIG. 7. The method steps preceding and including 530 shown in FIG. 7, can be, and are in this illustration, the same as those including and preceding 530 in FIG. 5. After 530, according to this variant to example 1, in 750 there is an assessment of whether a candidate cell from SIB11bis satisfies predetermined criteria. If it does not, then in 760 the UE stays camped on the current cell.

If the quality of the candidate cell the does satisfy a predetermined criteria, then in 770, the UE reselects to the candidate cell listed in SIB11bis.

Examples of the additional criteria are:

The measured signal level of the neighbour cell from SIB11bis must be greater than a threshold. This could be specified as an RSCP or Ec/Io threshold or both.

An additional offset could be added into the cell reselection criteria. For example the criteria could be: QUAL(neighbour)>QUAL (serving)+Offset(Cell)+Hysteresis+Offset (SIB11bis).

Another example of additional criteria relates to use of Treselection. Treselection is a timer that is started when the measured signal level (RSCP or Ec/Io) of a neighbour cell meets the cell reselection criteria. Typically the cell reselection criteria are that the signal level of the neighbour cell is better than that of the serving cell plus an offset value and/or a hysteresis value. Normally, if the cell reselection criteria are met for a period at least as long as Treselection then the UE performs reselection to the neighbour cell. The purpose of the Treselection timer is to provide some hysteresis in the time domain. The cell reselection criteria and the behaviour of Treselection is defined in 3GPP TS 25.304v10.4.0 "User Equipment (UE) procedures in Idle mode and procedures for cell reselection in connected mode (Release 10)", 2011-06.

The further example criteria comprises use of a longer Treselection value which means that the neighbour cell would have to meet the cell reselection criteria for longer before the reselection can be triggered. This longer value could be signalled, or perhaps a specified algorithm could be used, such as using 2*Treselection when reselecting to a SIB11bis neighbour cell when SIB11 has not been read.

The additional parameters could be provided to the UE via system information broadcast, for example, in SIB3.

The alternative 1b, whether considered alone with example 1, or together with 1a and/or 1c, provides the advantages of reducing unnecessary service interruption and the risk of reselection to a less than optimal cell from SIB11bis.

EXAMPLE 1c

Example 1c is another alternative that can be used together with example 1 to reduce the risk of reselection to a less than optimal cell from SIB11bis when a cell listed in SIB11 (that is not yet successfully acquired) may be available. Example 1c may be applied together with 1a and/or 1b.

If, as described in example 1, the UE starts performing measurements and cell reselection evaluation of cells listed in SIB11bis before SIB11 has been successfully acquired then it is possible that the UE could have Treselection running for a cell in SIB11bis at the instant when the UE does successfully acquire SIB11.

In this example, the UE can reselect to one of the cells from SIB11 rather than reselect to the cell from SIB11bis immediately that the Treselection timer expires.

To achieve this it is proposed that if Treselection was started for a cell from SIB11bis before SIB11 was acquired, then when Treselection for this cell expires the UE checks to see if Treselection is running for any cell from SIB11. If Treselection is running for a cell from SIB11 then the UE does not immediately reselect to the cell from SIB11bis but waits for Treselection for the SIB11 cell to expire or stop. If Treselection expires for the SIB11 cell then the UE will reselect to the SIB11 cell if it is a better cell. If Treselection is stopped for the SIB11 cell, because this cell no longer meets the cell reselection criteria, then the UE may reselect to the cell from SIB11bis. Alternatively, if Treselection is stopped for the SIB11 cell, and a Treselection timer is running for another cell from SIB11, then the UE may continue to wait until for that that Treselection timer to stop expire before further reselection. This is illustrated in more detail in FIG. 8.

Figure 8:
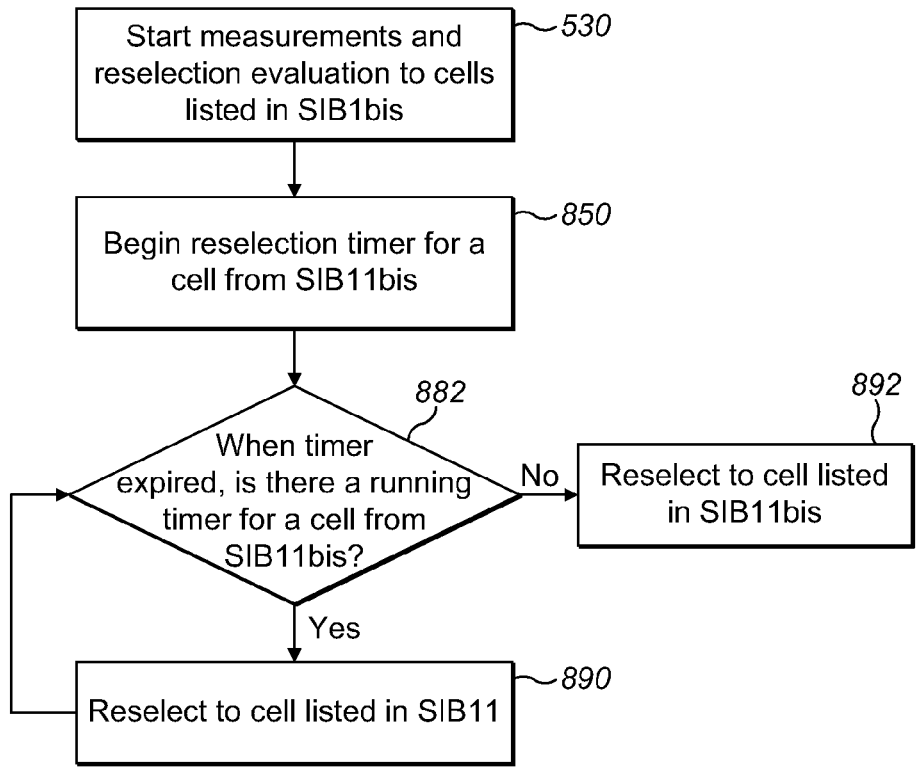
FIG. 8 is a flow diagram illustrating steps performed according to an alternative related to the first aspect of the approach described herein.

Example 1c is illustrated in FIG. 8. The method steps preceding and including 530 shown in FIG. 8, can be, and are in this illustration, the same as those including and preceding 530 in FIG. 5. After 530, according to this variant to example 1, in 850, a cell listed in SIB11bis is determined to meet the cell reselection criteria and thus a Treselection timer for the cell listed in SIB11bis is begun. Moving on to 882, when this timer has expired, there is an assessment of whether a Treselection timer is running for a better cell listed in SIB11, which may happen if SIB11 has been subsequently acquired and a better cell listed in SIB11 has been measured and found to meet the cell reselection criteria.

If there is no Treselection timer running for a cell listed in SIB11, then in 892, the UE reselects to a candidate cell from SIB11bis.

If in 884 there is a Treselection timer running for a better cell listed in SIB11, then the UE waits for the Treselection timer for the cell listed in SIB11 to expire or be stopped. In 886, the SIB11 timer expires, and then in 890 if a subsequent measurement confirms that the cell from SIB11 has satisfied a reselection criteria for at least Treselection (not shown), the UE reselects to the cell listed in SIB11.

Or, in 888, the Treselection timer for the SIB11 cell stops, for example because the measurements of that cell indicate that the cell no longer meets the cell reselection criteria. In this case, the method reverts to checking to see in 882 if there is a Treselection timer running for a(nother) better cell listed in SIB11. If there are no other cells listed in SIB11 that have a timer running, then the UE can reselect to the candidate cell listed in SIB11bis. However, if there are other SIB11 better cells with a running Treselection timer, then the UE may again wait to see if their timers expire in the period between a Treselection time for the SIB11bis candidate cell after receipt of SIB and follow the procedure described above if they do.

If a time is reached at which the SIB11bis candidate cell has satisfied a reselection criteria for Treselection since SIB11 has been received, then the UE will reselect to the SIB11bis cell at this time regardless of whether there are any Treselection timers running for cells from SIB11.

It is noted that in this example, reselection is on Treselection expiry; and this can be applicable to variations of the other examples described herein. However, there are variations of the examples that are not limited to reselection exactly on expiry of Treselection, in which reselection may occur at a different time, for example after a further measurement after Treselection expiry.

To illustrate (not shown) by way of further example, Treselection is set at 3 s, and UE is camped on cell 1 in idle. At t=0 SIB11bis is received, and Treselection is started for cell 2 which is better than cell 1. At t=1 s SIB11 is received and Treselection started for cell 3 which is better than cell 2 (and cell 1).

At t=3 s, Treselection expires for cell 2. In this example, even though we started Treselection for cell 2 earlier, because there is a better cell to which the UE would have reselected, the UE would not optimally select cell 2 at t=3 s.

Effectively, there is deferring reselection to cell 2 until a decision is made about cell 3. If Treselection expires for cell 3 (and a subsequent measurement confirms that cell 3 has satisfied the reselection criteria for at least Treselection) then there is reselection to cell 3. If Treselection is stopped for cell 3 because reselection criteria are no longer satisfied, then cell 3 is no longer a block to reselection to cell 2.

There may be other cells from SIB11 with Treselection running however which would still block reselection to cell 2. However, time t=4 s is reached, then cell 2 has satisfied the reselection criteria for Treselection since SIB11 was received, then the UE reselects to it at this time regardless of whether Treselection is running for any cells in SIB11.

Even if Treselection is running for cell 4 from SIB11, but cell 2 is better (ranked higher) than cell 4, then cell 4 won't block reselection to cell 2.

The temporary blocking is intended to allow better cells to "catch up" in running Treselection, to prevent the head-start given to SIB11bis cells because SIB11 hadn't arrived yet causing reselection to a cell that isn't the best neighbour cell.

The alternative 1c, whether considered alone with example 1, or together with 1a and/or 1b, also provides the advantages of reducing unnecessary service interruption, and also reducing the risk of reselection to a less than optimal cell from SIB11bis.

EXAMPLE 2

Example 2 may be used in addition to solution 1/1a/1b/1c, or as an alternative on its own.

This solution addresses the UE behaviour when the serving cell no longer meets the cell selection criteria (i.e. $S<=0$). This corresponds to the instant T4 in FIG. 3. According to this example, during the 12 s/4 s period during which the UE is required to search and perform measurements on cells provided in system information, the UE uses neighbour cell information from any SIB (SIB11, SIB11bis, and in another example, SIB12) that it has acquired even if not all SIBs have been acquired. That is, UE uses the neighbour cell information from SIB11bis, even if SIB11 has not yet been acquired.

Figure 9:
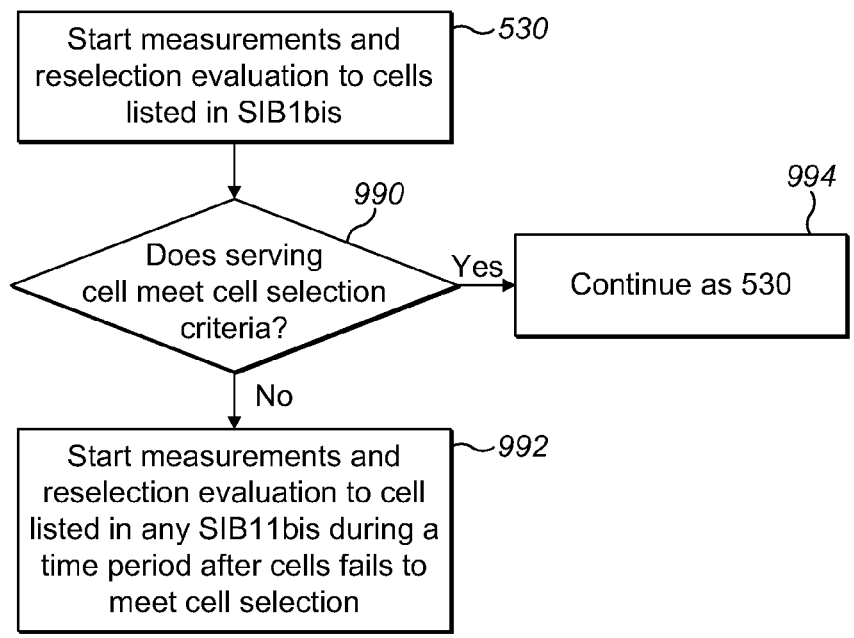
FIG. 9 is a flow diagram illustrating steps performed according to a second aspect of the approach described herein.

Example 2, when considered in addition to example 1 for instance, is illustrated in FIG. 9. The method steps preceeding and including 530 shown in FIG. 9, can be, and are in this illustration, the same as those including and preceding 530 in FIG. 5. After 530, according to this example, in 990, there is an assessment of whether the serving cell (the cell the UE is currently camped on) meets the cell selection criteria.

If in 992, it is determined that the serving cell fails to meet cell selection criteria, the UE performs measurements and reselection evaluation on the serving cell and neighbouring cells for 12 seconds in DRX and 4 seconds in FACH, according to the Standard. After this time, in this example, the UE begins to make measurements and cell reselection evaluation of cells listed in any SIB that has already been acquired. This is independent of whether there are some SIBs from a set of SIBs for measurement control information—such as SIB11, SIB11bis and SIB12, that are yet to be acquired. So in this example, measurements and cell reselection can be begun towards cells listed in SIB11bis even before receipt of SIB11, say.

If the serving cell does meet the cell selection criteria, then in 994, the method proceeds according to the steps illustrated in FIG. 5 at 530, optionally extending to steps 650, 750, 850 etc., for examples 1a, 1b, or 1c.

4.2.2.1 of the 25.133v10.20 standard describes measurement and evaluation of cell selection criteria S of a serving cell, with changes consistent with this example indicated here.

The UE shall measure the CPICH Ec/Io and CPICH RSCP level of the serving cell and evaluate the cell selection criterion S defined in [1] for the serving cell at least every DRX cycle. The UE shall filter the CPICH Echo and CPICH RSCP measurements of the serving cell using at least 2 measurements. Within the set of measurements used for the filtering, at least two measurements shall be spaced by, at least $T_{measureFDD}/2$ (see table 4.1).

If the UE has evaluated in $N_{serv}$ consecutive DRX cycles that the serving cell does not fulfil the cell selection criterion S, the UE shall initiate the measurements of all applicable neighbour cells indicated in the measurement control system information, regardless of the measurement rules currently limiting UE measurement activities. If the UE has not successfully acquired a complete set of measurement control system information (System Information Block 11, 11bis and 12) the UE shall initiate the measurements of all applicable neighbour cells indicated in the measurement control system information that has been acquired.

If the UE has not found any new suitable cell based on searches and measurements of the neighbour cells indicated in the measurement control system information for 12 s, the UE shall initiate cell selection procedures for the selected PLMN as defined in [1].

After this 12 s period a UE in Cell:PCH or URA_PCH is considered to be "out of service area" and shall perform actions according to 25.331.

On transition from CELL_DCH to CELL_PCH/URA_PCH, if a UE cannot find a suitable UTRA cell, then it is considered to be "out of service area" and shall perform actions according to [16].

If the S criterion of the serving cell is no longer fulfilled, the UE may suspend MBMS reception if necessary to improve the UE's ability to find a suitable cell.

If the S criterion of the serving cell is fulfilled, the measurement requirements when a MBMS reception is active are specified in sections 4.2.2.2 and 4.2.2.9.

EXAMPLE 3

Example 3 requires that SIB11bis must have been acquired, but SIB11 from the current serving cell has not been successfully acquired. The UE uses a SIB11 that may be otherwise available, such as one acquired from a previous serving cell, one from a neighbouring cell that is identified as a neighbouring cell from the SIB11bis from the current serving cell; or a cached SIB11 from the serving cell; for example. This example can be used on its own, or in combination with example 1, 1a, 1b, 1c, and/or 2.

SIB11bis is typically used for a UE in urban city areas where the radii of the cells are small and there are many neighbour cells. Neighbour cells contained in the SIB11 would be not only direct neighbours to the serving cell but also not direct neighbours. In such deployments, neighbour cell lists broadcast in the serving cell and the in the direct neighbour cells would contain many common cells. Therefore, in the situation where cell reselection is required urgently (the serving cell radio condition is not good) and SIB11 is not yet available then according to this example, the UE uses the SIB11 received in the previous cell. In one preferable example, this is on condition or assumption that SIB11 is not known to be invalid due to a changed value tag. The UE is likely to have detected and have recent measurement data for some of the common cells, and so advantageously cell selection or reselection can be relatively quick.

The UE may determine that a SIB is invalid if, after reception of the SIB, the UE received an indication that system information has changed, and a value tag for the SIB that is different from the value tag that was stored at reception of the SIB. Determining that a SIB is invalid is a trigger for the UE to start re-acquiring that that SIB. In the scenario the UE may have acquired SIB11 from the previous cell, have received an indication that system information has changed and a changed value tag for SIB11, and hence determined that SIB11 is invalid.

The UE then reselects to another cell before it has been able to re-acquire SIB11.

Figure 10:
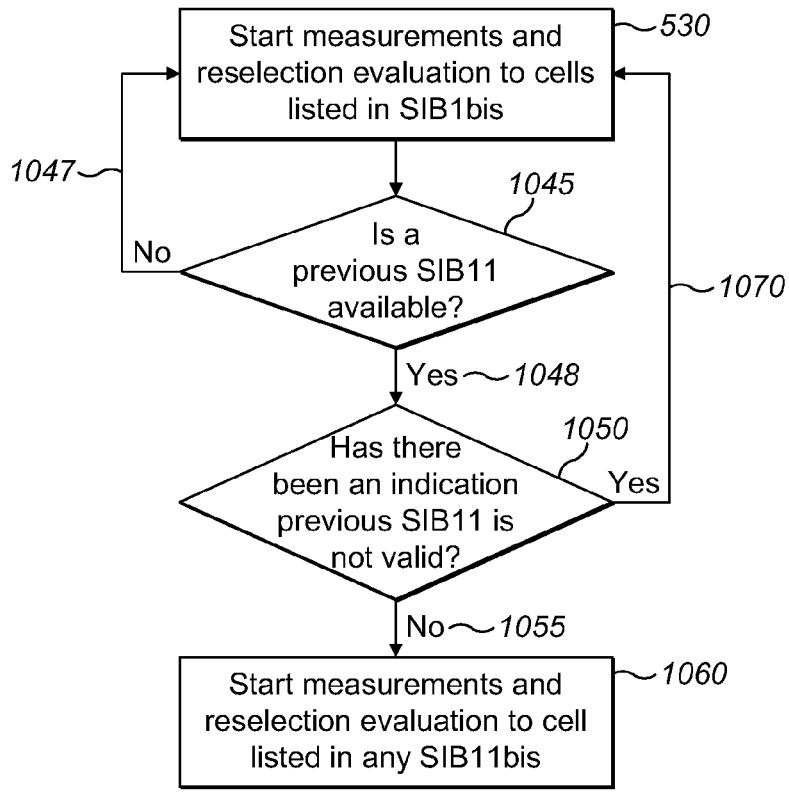
FIG. 10 is a flow diagram illustrating steps performed according to a third aspect of the approach described herein.

Example 3, when considered in addition to example 1 for instance, is illustrated in FIG. 10. The method steps preceeding and including 530 shown in FIG. 10, can be, and are in this illustration, the same as those including and preceding 530 in FIG. 5. After 530, according to this example, in 1045, there is a determination of whether there is a previous SIB11 available. If there is not 1047; the method returns to continuing measurement and reselection evaluation of cells listed in SIB11bis 530, to be augmented by SIB11 measurements when SIB11 is received.

If there is a previous SIB11 available 1048, then in 1050, there is an assessment of whether the previous SIB11 is still valid. In the example illustrated, there is a determination (optional in some variations) of whether there has been a indication that the previous SIB11 is not valid; 1050. If not 1055, then in 1060, the UE starts measurements and cell selection or reselection towards cells listed in the previous SIB11.

If it is determined that there has been an indication that the previous SIB11 is not valid 1070, then the method continues at 530 (optionally extending to steps 650, 750, 850, 990 etc., of examples 1a, 1b, 1c, and/or 2.

An alternative, as mentioned above, to considering use of SIB11 from a previous serving cell, is to determine whether there is available a SIB11 that is identified as from a neighbouring cell in the SIB11bis (or SIB11bis and SIB12 in connected mode) received from the serving cell.

A further alternative is to consider use of a cached SIB11 from the serving cell, in the case where this SIB11 is indicated to have changed since it was read.

SIB11bis can contain less favourable candidates e.g. inter-frequency or inter RAT cells. Hence, using the valid SIB11 from the previous cell according to this example would more likely result in an intra-frequency reselection, avoiding unnecessary inter-frequency or inter-RAT reselections.

The cells lists in SIB11, SIB11bis and SIB12 can contain offset values to bias the cell reselection criteria. These offset values are specific to the specific serving cell/neighbour cell pair. There may be risk associated in applying an offset value in the current serving cell that had been acquired from the previous serving cell. In areas where different offset values are used frequently (e.g. urban canyons) the SIB11bis or another SIB indicates, in an alternative to this example, the use of SIB11 from the previous cell is not allowed. This has the advantage of reducing the risk of the UE performing an incorrect reselection, or not selecting when it should.

Figure 11:
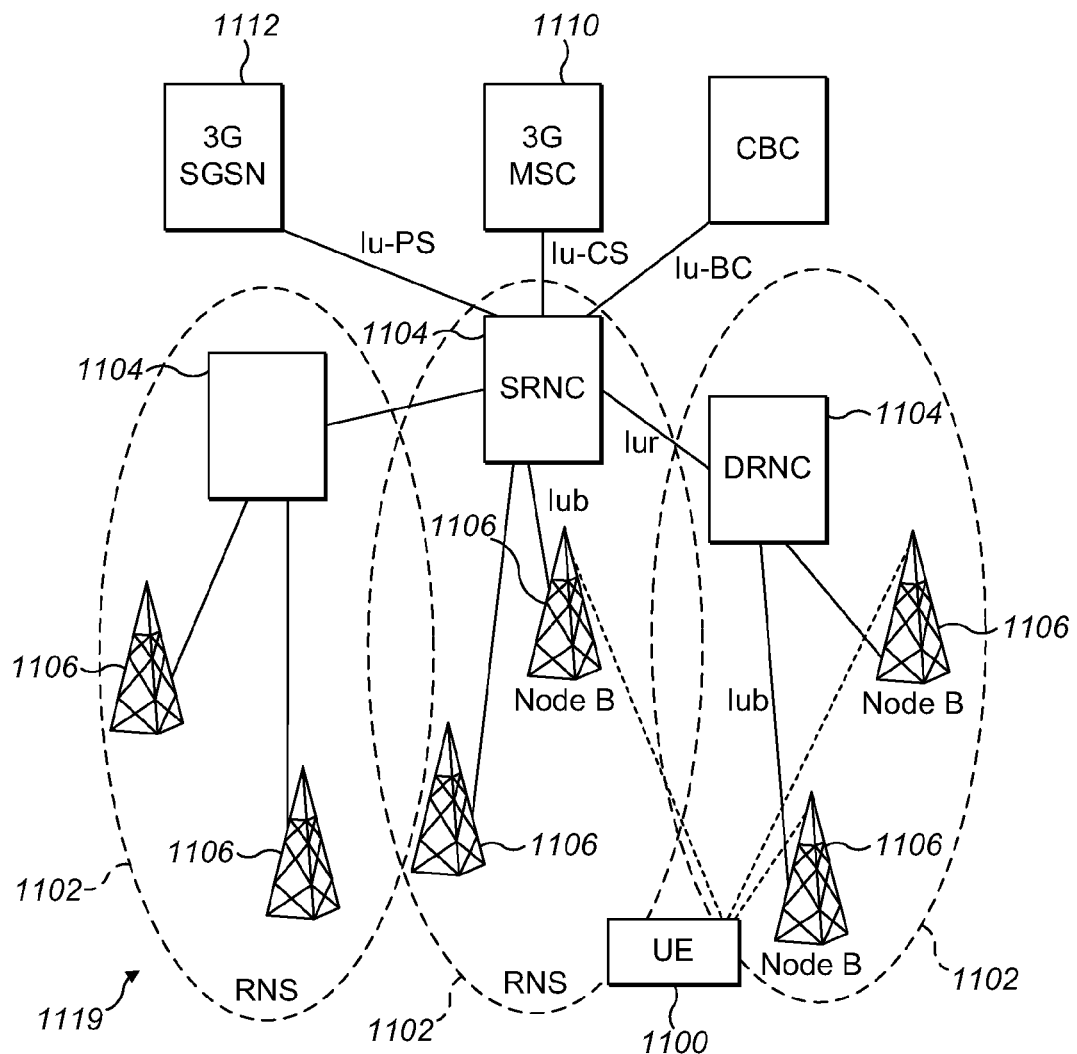
FIG. 11 shows an overview of a network and a UE device.

FIG. 11 shows an overview of a network and a UE device. Clearly in practice there may be many UE devices operating with the network but, for the sake of simplicity, FIG. 11 only shows a single UE device 700. For the purposes of illustration, FIG. 11 also shows a network 719 having a few components. It will be clear to a person skilled in the art that in practice a network will include far more components than those shown.

FIG. 11 shows an overview of the radio access network 719 (UTRAN) used in a UMTS system. The network 1119 as shown in FIG. 11 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 1100 may be mobile within the radio access network. Radio connections (indicated by the straight dotted lines in FIG. 11) are established between the UE and one or more of the Node Bs in the UTRAN.

The radio network controller controls the use and reliability of the radio resources within the RNS 1102. Each RNC may also connected to a 3G mobile switching centre 10 (3G MSC) and a 3G serving GPRS support node 12 (3G SGSN).

An RNC 1104 controls one or more Node B's. An RNC plus its Node B's together make up an RNS 1102. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 1106 may operate as more than one cell since it may operate at multiple frequencies and/or with multiple scrambling codes.

Figure 12:
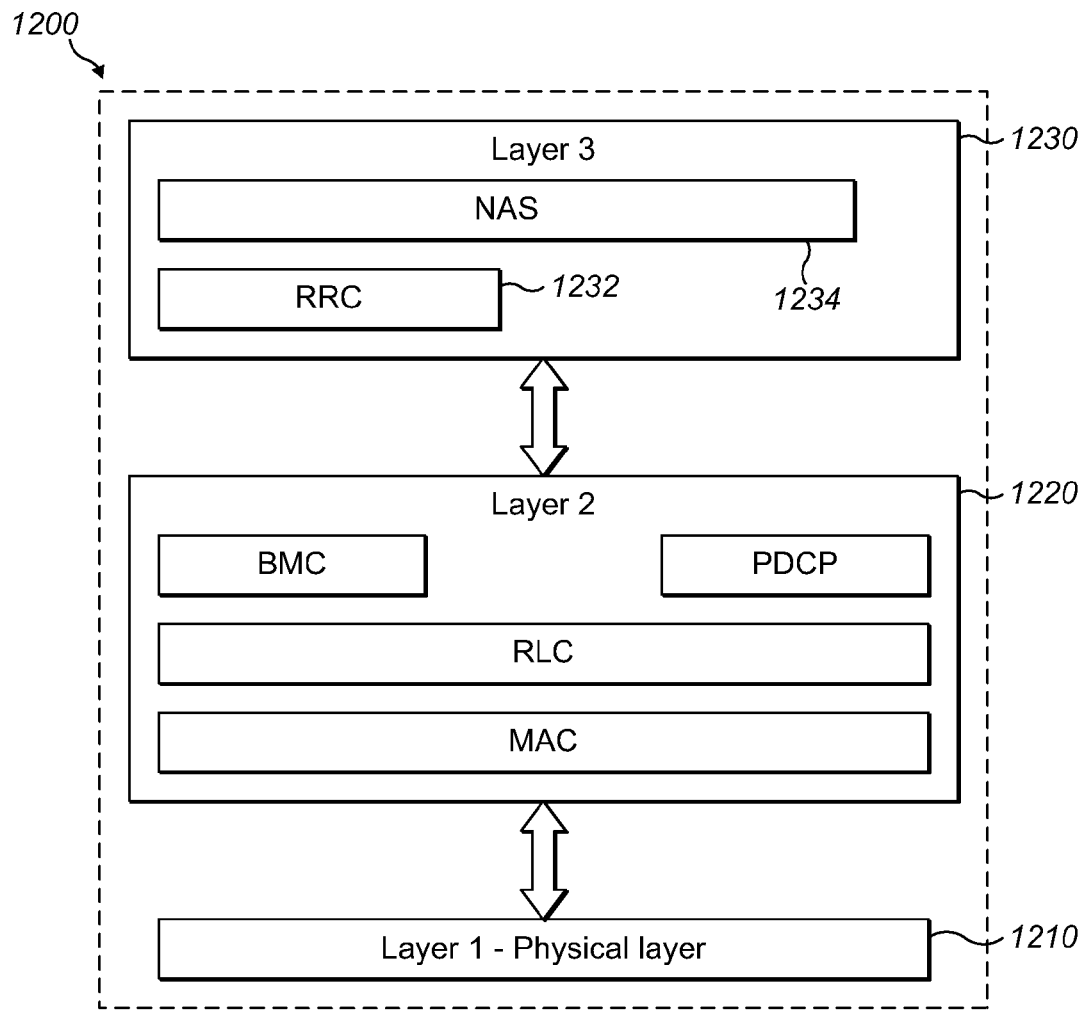
FIG. 12 is a block diagram illustrating an embodiment of a protocol stack provided in a UE device.

FIG. 12 is a block diagram illustrating an embodiment of a protocol stack provided in a UE. A Radio Resource Controller (RRC) block 1232 is a sub layer of Layer 3 1230 of a UMTS protocol stack 1200. The RRC 1232 exists in the control plane only and provides an information transfer service to the non-access stratum NAS 1234. The RRC 1232 is responsible for controlling the configuration of radio interface Layer 1 1210 and Layer 2 1220. When the UTRAN wishes to change the UE configuration it will issue a message to the UE containing a command to invoke a specific RRC procedure. The RRC layer 1232 of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The strategies for a method and apparatus for cell reselection for a wireless communication device as discussed above with reference to the drawings may be implemented by the RRC block 1232.

Figure 13:
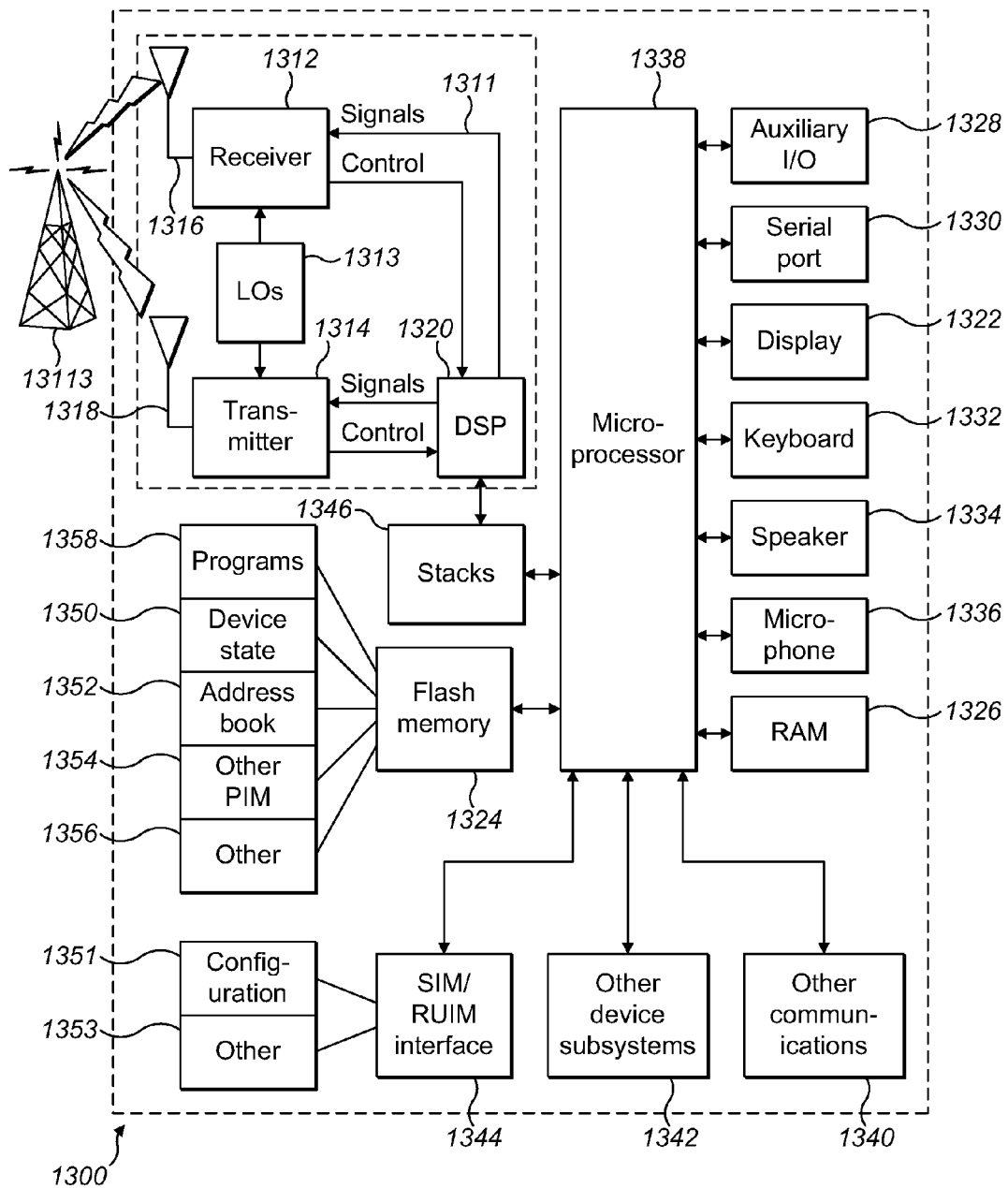
FIG. 13 is a block diagram illustrating a UE device.

Turning now to FIG. 13, FIG. 13 is a block diagram illustrating a mobile device, which can act as a UE and co-operate with the apparatus and methods of FIGS. 1 to 10, and which is an exemplary wireless communication device. Mobile station 1300 is preferably a two-way wireless communication device having at least voice and data communication capabilities. Mobile station 1300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 1300 is enabled for two-way communication, it will incorporate a communication subsystem 1311, including both a receiver 1312 and a transmitter 1314, as well as associated components such as one or more, preferably embedded or internal, antenna elements 1316 and 1318, local oscillators (LOs) 1313, and processing means such as a processing module such as a digital signal processor (DSP) 1320. As will be apparent to those skilled in the field of communications, the particular design of the communication subsystem 1311 will be dependent upon the communication network in which the device is intended to operate. For example, mobile station 1300 may include a communication subsystem 1311 designed to operate within the Mobitex™ mobile communication system, the DataTAC™ mobile communication system, GPRS network, UMTS network, EDGE network or LTE network.

Network access requirements will also vary depending upon the type of network 1302. For example, in the Mobitex and DataTAC networks, mobile station 1300 is registered on the network using a unique identification number associated with each mobile station. In LTE, UMTS and GPRS networks, however, network access is associated with a subscriber or user of mobile station 1300. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 1300 will be unable to carry out any other functions involving communications over the network 1302. The SIM interface 1344 is normally similar to a card-slot into which a SIM card can be inserted and ejected like a diskette or PCMCIA card. The SIM card can have approximately 64K of memory and hold many key configuration 1351, and other information 1353 such as identification, and subscriber related information.

When required network registration or activation procedures have been completed, mobile station 1300 may send and receive communication signals over the network 1302. Signals received by antenna 1316 through communication network 1302 are input to receiver 912, which may perform such common receiver functions as signal amplification, frequency down conversion, filtering, channel selection and the like, and in the example system shown in FIG. 13, analog to digital (A/D) conversion. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1302 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

Mobile station 1300 preferably includes processing means such as a microprocessor 1338 which controls the overall operation of the device. Communication functions, including at least data and voice communications, are performed through communication subsystem 1311. Microprocessor 1338 also interacts with further device subsystems such as the display 1322, flash memory 1324, random access memory (RAM) 1326, auxiliary input/output (I/O) subsystems 1328, serial port 1330, keyboard 1332, speaker 1334, microphone 1336, a short-range communications subsystem 1340 and any other device subsystems generally designated as 1342.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the microprocessor 1338 is preferably stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Microprocessor 1338, in addition to its operating system functions, preferably enables execution of software applications on the mobile station. A predetermined set of applications that control basic operations, including at least data and voice communication applications for example, will normally be installed on mobile station 1300 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1302. In a preferred embodiment, the PIM data items are seamlessly integrated, synchronized and updated, via the wireless network 1302, with the mobile station user's corresponding data items stored or associated with a host computer system.

Further applications may also be loaded onto the mobile station 1300 through the network 1302, an auxiliary I/O subsystem 1328, serial port 1330, short-range communications subsystem 1340 or any other suitable subsystem 1342, and installed by a user in the RAM 1326 or preferably a non-volatile store (not shown) for execution by the microprocessor 1338. Such flexibility in application installation increases the functionality of the device and may provide enhanced on-device functions, communication-related functions, or both. For example, secure communication applications may enable electronic commerce functions and other such financial transactions to be performed using the mobile station 1300.

In a data communication mode, a received signal such as a text message or web page download will be processed by the communication subsystem 1311 and input to the microprocessor 1338, which preferably further processes the received signal for output to the display 1322, or alternatively to an auxiliary I/O device 1328. A user of mobile station 1300 may also compose data items such as email messages for example, using the keyboard 1332, which is preferably a complete alphanumeric keyboard or telephone-type keypad, in conjunction with the display 1322 and possibly an auxiliary I/O device 1328. Such composed items may then be transmitted over a communication network through the communication subsystem 1311.

For voice communications, overall operation of mobile station 1300 is similar, except that received signals would preferably be output to a speaker 1334 and signals for transmission would be generated by a microphone 1336. Alternative voice or audio I/O subsystems, such as a voice message recording subsystem, may also be implemented on mobile station 1300. Although voice or audio signal output is preferably accomplished primarily through the speaker 1334, display 1322 may also be used to provide an indication of the identity of a calling party, the duration of a voice call, or other voice call related information for example.

Serial port 1330 in FIG. 13, would normally be implemented in a personal digital assistant (PDA)-type mobile station for which synchronization with a user's desktop computer (not shown) may be desirable, but is an optional device component. Such a port 1330 would enable a user to set preferences through an external device or software application and would extend the capabilities of mobile station 1300 by providing for information or software downloads to mobile station 1300 other than through a wireless communication network. The alternate download path may for example be used to load an encryption key onto the device through a direct and thus reliable and trusted connection to thereby enable secure device communication.

Other communications subsystems 1340, such as a short-range communications subsystem, is a further optional component which may provide for communication between mobile station 1300 and different systems or devices, which need not necessarily be similar devices. For example, the subsystem 1340 may include an infrared device and associated circuits and components or a Bluetooth™ communication module to provide for communication with similarly enabled systems and devices.

When mobile device 1300 is used as a UE, protocol stacks 1346 include a method and apparatus for cell reselection for a wireless communication device.

Extensions and Alternatives

In the foregoing specification, concepts have been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

In one example there is provided a method for cell selection or reselection in a user equipment UE for use in a mobile telecommunications system, in which the UE is arranged to receive a plurality of system information blocks (SIBs) including a primary SIB and a secondary SIB of the same type; the method comprising: conditional on receipt of the secondary SIB before receipt of the primary SIB; starting (initiating) measurements, and cell reselection evaluation of cells listed in the secondary SIB.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method for cell reselection in a user equipment UE for use in a mobile telecommunications system, in which the UE is arranged to receive a plurality of system information blocks SIBs including a primary SIB and a secondary SIB of the same type and in which the UE is camped on a first cell, and in which the cells listed comprise a second cell for reselection; the method comprising:
conditional on receipt of the secondary SIB before receipt of the primary SIB;
starting measurements, and cell reselection evaluation, of cells listed in the secondary SIB;
reselecting to the second cell conditional upon satisfying a predetermined criteria;
and in which the predetermined criteria relates to a quality of the first cell, and in which the predetermined criteria comprises:
a received signal strength of the first cell or a signal-to-interference ratio of the first cell is below a threshold;
the UE has attempted to receive the primary SIB for more than a predetermined period of time; or
for a communications channel carrying the SIBs, an indication of errors on the channel is above a threshold.

2. The method as claimed in claim 1, in which
the UE is camped on a first cell, and in which
the cells listed comprise a second cell for reselection; the method further comprising:
reselecting to the second cell conditional upon satisfying a predetermined criteria.

3. The method as claimed in claim 1, in which
the UE is camped on a first cell, and in which
the cells listed comprise a second cell for reselection; the method further comprising:
reselecting to the second cell conditional upon satisfying a predetermined criteria;
and in which the predetermined criteria relates to a quality of the first cell and the quality of the second cell.

4. The method as claimed in claim 1, in which
the UE is camped on a first cell, and in which
the cells listed comprise a second cell for reselection; the method further comprising:
reselecting to the second cell conditional upon satisfying a predetermined criteria;
in which the predetermined criteria comprises:

$$Srxlev_{ServingCell} <= S_{SIB11\text{-}threshP} \text{ or}$$
$$Squal_{ServingCell} <= S_{SIB11\text{-}threshQ}.$$

5. The method as claims in claim 1; further comprising:
initiating a secondary SIB treselection timer for a cell listed in the secondary SIB; and when the secondary SIB treselection timer expires,
reselecting to a cell listed in the primary SIB or the secondary SIB dependent at least in part upon whether there is a running primary SIB treselection timer for a cell listed in the primary SIB.

6. The method as claimed in claim 1, further comprising:
initiating a secondary SIB treselection timer for a cell listed in the secondary SIB; and when the secondary SIB treselection timer expires,
reselecting to a cell listed in the primary SIB or the secondary SIB dependent at least in part upon whether there is a running primary SIB treselection timer for a cell listed in the primary SIB; and further comprising:
conditional on there being no primary SIB treselection timer running:
reselecting to a cell listed in the secondary SIB.

7. The method as claimed in claim 1 further comprising:
initiating a secondary SIB treselection timer for a cell listed in the secondary SIB; and when the secondary SIB treselection timer expires,
reselecting to a cell listed in the primary SIB or the secondary SIB dependent at least in part upon whether there is a running primary SIB treselection timer for a cell listed in the primary SIB; and
conditional on there being a primary SIB treselection timer running;
reselecting to a cell listed in the primary SIB if the primary SIB treselection timer expires and the cell in the primary SIB satisfies a reselection criteria, and
assessing whether there is a further primary SIB treselection timer running if the primary SIB treselection timer stops.

8. The method as claimed in claim 1; further comprising:
conditional on receiving no indication that a previously received primary SIB is no longer valid:
starting measurements, and cell reselection evaluation, of cells listed in the previously received primary SIB.

9. The method as claimed in claim 1, in which the secondary SIB comprises the information elements IEs "Intra-frequency cell info list", "Inter-frequency cell info list" and "Inter-RAT cell info list", one or more of the IEs comprising the listed cells.

10. The method as claimed in any one of the previous claims, in which receipt of the primary SIB comprises the UE successfully receiving system information from the primary SIB.

11. A method for cell reselection in a user equipment UE for use in a mobile telecommunications system, in which the UE is arranged to receive a plurality of system information blocks SIBs including a primary SIB and a secondary SIB of the same type; the method comprising:
conditional on receipt of the secondary SIB before receipt of the primary SIB; starting measurements, and cell reselection evaluation, of cells listed in the secondary SIB, the method further comprising:
starting measurements, and cell reselection evaluation, of cells listed in a previously received primary SIB.

12. A non-transitory data carrier carrying data comprising instructions executable by processing means to cause those means to carry out a method according to claim 1.

13. A non-transitory computer readable medium having computer executable instruction adapted to cause a device to perform a method of claim 1.

14. A method for cell reselection in a user equipment UE for use in a mobile telecommunications system, in which the UE is arranged to receive a plurality of system information blocks SIBs including a primary SIB and a secondary SIB of the same type, wherein the UE is camped on a first cell, and in which the cells listed comprise a second cell for reselection; the method comprising:
conditional on receipt of the secondary SIB before receipt of the primary SIB;

starting measurements, and cell reselection evaluation, of cells listed in the secondary SIB;

reselecting to the second cell conditional upon satisfying a predetermined criteria; and in which the predetermined criteria relates to a quality of the second cell, and in which the predetermined criteria comprises:

a measured signal level of second cell being greater than a predetermined threshold;

a reselection criteria for the second cell being satisfied by more than a predetermined off set; or a reselection criteria being satisfied by the second cell for a predetermined reselection period plus an additional period.

15. A method for cell reselection in a user equipment UE for use in a mobile telecommunications system, in which the UE is arranged to receive a plurality of system information blocks SIBs including a primary SIB and a secondary SIB of the same type; the method comprising:

conditional on receipt of the secondary SIB before receipt of the primary SIB; starting measurements, and cell reselection evaluation, of cells listed in the secondary SIB, the method further comprising, when for reselection, and when the UE is camped on a first cell:

after a predetermined time after the first cell failing to meet a cell selection criteria:

starting measurements and cell reselection evaluation towards cells in any received SIB.

16. The method as claimed in any claim 1, in which the type of SIB is type 11, the primary SIB comprises SIB 11, and the secondary SIB comprises SIB11bis.

17. A wireless telecommunications device comprising:
a transceiver for transmitting and receiving radio signals;
a processor; and
a memory having stored therein: one or more routines executable by the processor, the one or more routines being adapted for cell reselection in a user equipment UE for use in a mobile telecommunications system, in which the UE is arranged to receive a plurality of system information blocks SIBs including a primary SIB and a secondary SIB of the same type; comprising one or more routines adapted to:

on receipt of the secondary SIB before receipt of the primary SIB:

start measurements, and cell reselection evaluation, of cells listed in the secondary SIB.

18. A wireless telecommunications device comprising:
a transceiver for transmitting and receiving radio signals;
a processor; and
a memory having stored therein: one or more routines executable by the processor, the one or more routines being adapted for cell reselection in a user equipment UE for use in a mobile telecommunications system, in which the UE is arranged to receive a plurality of system information blocks SIBs including a primary SIB and a secondary SIB of the same type; comprising one or more routines adapted to:

conditional on receipt of the secondary SIB before receipt of the primary SIB;

starting measurements, and cell reselection evaluation, of cells listed in the secondary SIB, the method further comprising, when the UE is camped on a first cell:

conditional on the first cell failing to meet a cell selection criteria:

starting measurements, and cell reselection evaluation, of cells in any received SIB.

* * * * *

UNITED STATES PATENT AND TRADEMARK OFFICE
CERTIFICATE OF CORRECTION

PATENT NO. : 8,600,388 B2  Page 1 of 1
APPLICATION NO. : 13/286723
DATED : December 3, 2013
INVENTOR(S) : Magadi Rangaiah et al.

It is certified that error appears in the above-identified patent and that said Letters Patent is hereby corrected as shown below:

IN THE CLAIM

Claim 5, column 19, line 60, delete "claims" and insert --claimed--.

Signed and Sealed this
Fifteenth Day of April, 2014

Michelle K. Lee
*Deputy Director of the United States Patent and Trademark Office*